United States Patent [19]

Yang

[11] Patent Number: 4,994,727
[45] Date of Patent: Feb. 19, 1991

[54] CHARGING CIRCUITRY HAVING POLARITY DETECTING PROTECTION

[76] Inventor: Tai-Her Yang, 5-1 Taipin St., Si-Hu Town, Dzan-Hwa, Taiwan

[21] Appl. No.: 338,149

[22] Filed: Apr. 14, 1989

Related U.S. Application Data

[60] Division of Ser. No. 103,404, Oct. 1, 1987, Pat. No. 4,855,662, which is a continuation-in-part of Ser. No. 822,222, Jan. 24, 1986, abandoned.

[51] Int. Cl.$^5$ .............................................. H02J 7/00
[52] U.S. Cl. ..................................................... 320/26
[58] Field of Search ................................ 320/2, 25, 26

[56] References Cited

U.S. PATENT DOCUMENTS 4,663,579 5/1987 Yang ........................................ 320/26
4,701,688 10/1987 Guim ........................................ 320/25

Primary Examiner—R. J. Hickey
Attorney, Agent, or Firm—Leonard Bloom

[57] ABSTRACT

Disclosed are various circuits which assure safe connection of battery chargers or other electrical apparatus, wherever two sets or pairs of terminals are to be connected safely. Additionally, overload protection modules and On-time delay modules prevent overloads from being transmitted to the receiving side and delay the connection to the end terminals. Further, a minimum charger-voltage-detector version prevents use when not safe. Various embodiments of circuit modules, including using a micro processor, are presented in accordance with the invention.

1 Claim, 10 Drawing Sheets

CHARGING CIRCUITRY HAVING POLARITY DETECTING PROTECTION

CROSS-REFERENCE TO RELATED APPLICATION

This application is a division of application Ser. No. 103,404, filed Oct. 1, 1987, now U.S. Pat. No. 4,855,662, which is a continuation-in-part of application Ser. No. 822,222, filed Jan 24, 1986, now abandoned.

BACKGROUND OF THE INVENTION

In the parallel wiring of paired D.C. power equipment having unknown polarity conditions, such as in the charging of batteries, accidents can occur due to negligence, especially where the connections are being made during nightime or where the available light is poor.

SUMMARY OF THE INVENTION

Accordingly, it is an object of the present invention to alleviate the disadvantages and deficiencies of the prior art by providing an improved polarity detection means for electrical circuitry, such as battery charging circuitry.

In accordance with the broad teachings of the present invention, the parallel electric circuit of two different sources (or source and recipient) each having an unknown polarity relationship with respect to each other, are each fed to the circuitry of the invention and (polarity-wise) are properly connected. This prevents human negligence and facilitates switch connections by automatic polarity correction of connections. Thus the present invention provides a design with low cost, high reliability, and a wide range of applications and uses.

These and other objects of the present invention will become apparent from a reading of the following specification, taken in conjunction with the enclosed drawings.

BRIEF DESCRIPTION OF THE DRAWINGS

FIG. 1-1 is a view of FIG. 1 with an On-time delay circuit block.

FIG. 1-2 is a view of an automatic polarity amending circuit with a single set of double-coils as "change-over relay".

FIG. 1-3 is a view of an embodiment of a series type time-delay circuit.

FIG. 1-4 is a view of a double-coil relay.

FIG. 1-5 is a view of a double-coil relay with a spring biased open permanent magnet.

FIG. 2 is a view of an automatic polarity correction circuit with two independent sets of single coil relays.

FIG. 3 is a view of an electric circuit with a single pole relay and a single active condition.

FIG. 3-1 is a view of FIG. 3 with an On-time delay circuit block.

FIG. 3-2 is a view of the example of FIG. 3 with a specific On-time delay circuit.

FIG. 4 is a view of a double set relay-type automatic polarity correction circuit detected by a unipolar power source and voltage drop across resistance.

FIG. 4-1 is a view of the electric circuit of the polarity detecting equipment with voltage drop across resistance, bridge rectification and photo coupling of a series Zener diode.

FIG. 4-2 is a view of polarity detecting relay circuit driven by a reverse parallel diode with Zener diode.

FIG. 4-3 is a view of an SCR circuit triggered by a photo coupler.

FIG. 4-4 is a view of an SCR circuit triggered by a polarity detecting relay circuit.

FIG. 4-5 is a view of the On-time delay circuit block with voltage drop detection.

FIG. 4-6 is a timing diagram of the overload interval protective action process.

FIG. 4-7 is a view of the embodiment of a voltage drop detection and On-time delay circuit.

FIG. 4-8 is a view of an applicable embodiment of the On-time delay circuit connected in series with a voltage-drop-detecting Zener diode.

FIG. 4-9 is a view of the applicable embodiment of the voltage drop circuit connected in series with an On-time delay circuit.

FIG. 5 is a view of the embodiment of an automatic polarity correction circuit using a microprocessor and a double set of change-over relays.

FIG. 5-1 is a view of an embodiment of an automatic polarity correction circuit with a microprocessor and a single set of change-over relay.

FIG. 6 is a view of an automatic polarity correction circuit embodiment having double sets of double-coil change-over relays with low voltage limitation.

FIG. 6-1 is a schematic diagram of the switch transistor Q601 shown in a portion of FIG. 6.

FIG. 6-2 is a schematic diagram of the switch transistor Q602 shown in a portion of FIG. 6.

FIG. 7 is a view of automatic polarity amending circuit embodiment having two sets of double-coil change-over relays with low voltage limitation and an On-time delay circuit.

FIG. 8 is a view of an automatic polarity correction circuit embodiment having a single set of double-coil change-over relay with low voltage limitation.

FIG. 8-1 is a schematic diagram of the switch transistor Q801 shown in a portion of FIG. 8.

FIG. 8-2 is a schematic diagram of the switch transistor Q802 shown in a portion of FIG. 8.

DETAILED DESCRIPTION OF THE INVENTION

For a long time the manual parallel connection between a charger and a battery, or between two batteries, or between loads having a polarity relationship (i.e., on an energy storage load) can, if proper care is not taken, easily generate a nonmatching/ reverse polarity connection and then combustion or an ensuing accident may occur. In the invention here and this design, a switching circuit with an automatic polarity correction function is used for preventing the above-noted defects In order to get the desired automatic polarity correction function, the electric circuits composed of an electro-mechanical type, or an electronic type, or a microprocessor are designed for performing the above-said aim. Its feature lies in that (1) a change-over switch, (2) a polarity detector composed of electric differential type or electronic type or microprocessor components, and (3) a processing circuit of the invention are installed between two parallel sets of pairs of electrical transmission conducting wire terminals so that the invention will change the connection between one wire of each pair for both pairs to the same polarity connection in a suitably quick time, when there are reverse polarities on two input sides and at all times connect matching polarity terminals.

Figure 1:
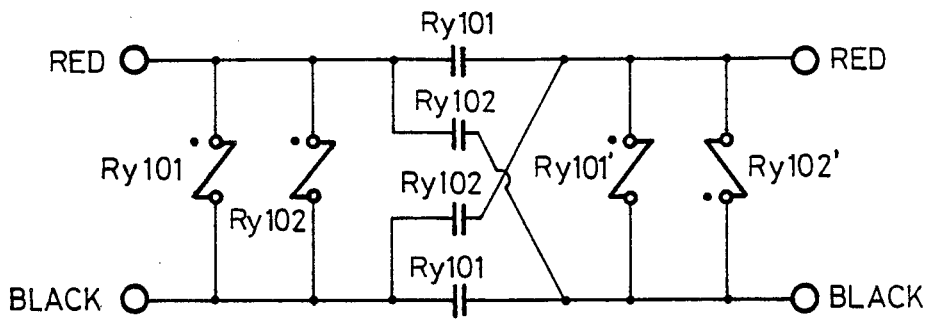
FIG. 1 is a view of the automatic polarity correction circuit of a first embodiment of the invention, shown with two sets of double coil change-over relays.
Figure 1:
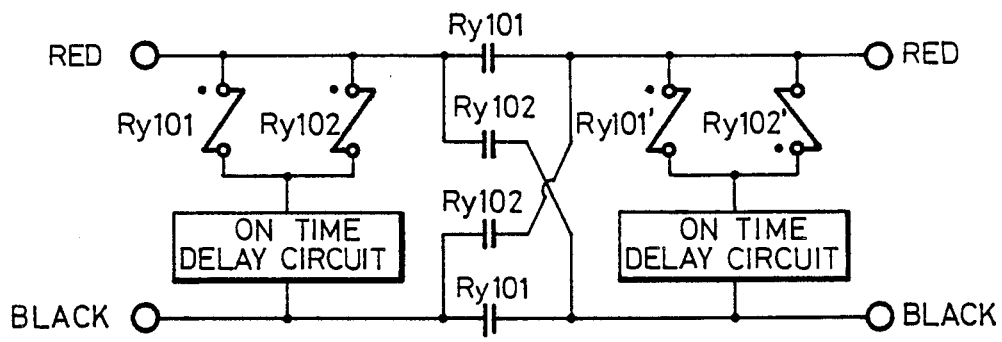

FIG. 1 is a view of one embodiment of the automatic polarity correction apparatus utilizing an electric differential "relay", in which the change-over device is composed of two relays RY101, RY102. Each of these relays has a double set of drive coils, i.e. it can act only when two sets of coils have the same directional magnetizing. In reverse, it can't either when (1) only one coil is magnetized or (2) two (both) coils have reverse magnetization. Two sets of normally open contact points (double pole) are installed on it, in which the contact points of each pole of relay RY101 are connected respectively to the same named terminal of both sets of power sources (i.e. "red" of left to "red" of rich, "black" of left to "black" of right). The two coils of RY101 have the same magnetizing directions in position and are each connected in parallel respectively with respect to the same-named terminals of both sides/sources. The two independent sets of contact points of both poles of relay RY102 are connected crossedly, that is from left "red" to right "black" and from left "black" to right "red". Its two coils have reverse magnetization polarity with respect to each other and are connected in parallel respectively between same-named connecting ends on both sides. Its active process and functions are as follows:

(i) When the input on the left side and on the right side have the same polarity, that is left "red" is positive with respect to left "black" and similarly for the right side, then the two sets of coils of RY101 have magnetization in same direction causing the normally open contacts of both poles to close, so that the terminals connecting ends of each sides connect to the same-named terminal of the other side, i.e. "red" left to "red" right and "black" left to "black" right. At the same time, the two coils of relay RY102 have reverse magnetizing and thus RY102 is disabled, that is, the normally open contacts stay open.

(ii) When the respective named inputs on the left side and on the right side have different polarities, the two coils of RY102 have the same magnetizing direction, and act, so that the respective connecting ends on both sides connect crossedly and the connections between the two sides are thus amended to connect the oppositely-named terminals/connecting ends of both sides.

A major use is to avoid the generation of a spark during power source parallel connection, for example, when battery terminals of one battery are clamped by hand to the terminals of another battery. As shown in FIG. 1-1, the above-said electric circuit of FIG. 1 can be connected with an On-time delay circuit comprised of (1) a traditional electronic type of (2) an electro-mechanical type, with each On TM time delay circuit block connected between the common terminals of one coil of both relays that are on the same side for delaying the start of the active time of the relay connection system.

Figures 1, 2:
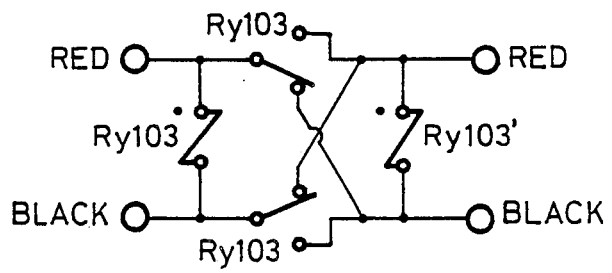

Furthermore, in order to reduce the cost, the above-described electric circuit can alternatively be comprised of a single relay with two sets of common wiper and normally open (or normally closed) contact points as shown in FIG. 1-2. As described in the above description, this relay has two sets of drive coils 103, 103'. As shown in this configuration the "relay" can act, when the two sets of drive coils have same polarity of magnetization. If a single set only has magnetization energy, or each coil of a double set has reverse polarity magnetization with respect to each other, it can't act and keep (close). Each common contact points, otherwise known as wipers, connects with its respective terminal, red and black of the left, whereby normally open (or normally closed) side contact points are connected so that if left "red" is of the same polarity as right "red" then the relay will activate both wipers to go to (connect) the closed position contacts and thus connect left "red" to right "red" and left "black" to right "black". Otherwise, the wipers will connect to the "open" position causing cross connection, i.e., left "red" to right "black" and left "black" to right "red".

Figures 1, 2, 3:
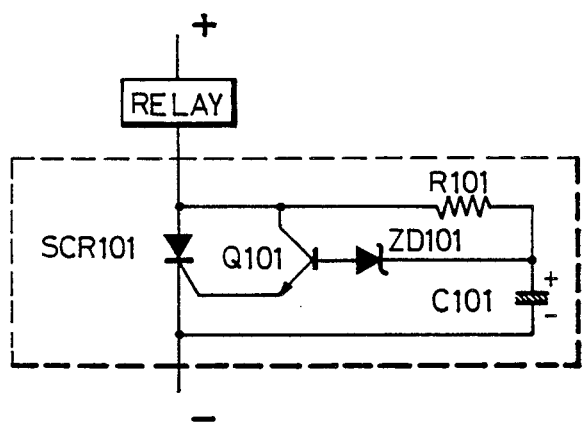

The above-described On-time delay circuit in FIG. 1-1 can be made by a conventional electro-mechanical type or by an electronic circuit. FIG. 1-3, an On-time delay circuit, is a single electric circuit, in which a gate-controlled-device, transistor-type such as SCR101, connects in series with a relay coil outside this device, and NPN transistor Q101 connects in parallel such that the emitter of Q101 connects to the gate of SCR101 and the collector of Q101 connects to the positive (anode) terminal of the SCR. A terminal of delay resistor R101 connects to the SCR's positive terminal/anode and its other end connects with one terminal of a delay capacitor C101 and connects with the Zener diode ZD101, and the negative pole of Zener diode connects with the gate of the NPN transistor. The other end of this capacitor connects to the SCR's negative terminal. When the electric current is inputted, the voltage at the "+" side of C101 caused by an RC delay circuit comprised of R101 and C101 becomes exponentially higher in time than the inherent Zener voltage of the Zener Diode, the Zener kicks in, and then the transistor Q101 is driven, so that the SCR is then triggered and then the relay in series, i.e. RY101, or RY102 activated. The mode between the R101 and C101 is at the "+" terminal of the capacitor C101 and as such its voltage can not increase instantaneously in time despite also being connected to the drop side of R101. Thus its voltage increases exponentially in time. A bleeding diode CR101 is connected in parallel with resistor R101, the output end thereof is connected in parallel with the anode of the SCR, the other end is connected to the capacitor, permitting also discharging of the capacitor (SCR in stand-by state).

FIG. 1-4 is a view of a "change-over relay" with two sets of drive coils, in which the coil can be wound concentrically in two sections or two layers.

FIG. 1-5 shows the permanent magnet used for helping to keep a relay continuously ON. It is installed on the switching-on side of the relay magnetic circuit, so that the relay vibration can be reduced during the coil drive and the switching property can be improved.

In order to reduce the costs of this design or to reduce the special requirement of these relays, i.e. special relays, FIG. 2 is an example view of an electric circuit achieved by a commercially available, i.e. normal, relays with double pole normally-open contact points, in which the normally-open contact points (of positive directional relay RY201) are connected respectively between the terminals/conducting wire of the "same color" on both sides. Both ends of its coil are connected in series respectively with the emitters of two sets of switch transistors Q201 and Q202 and the collectors of same are connected respectively with the two input conducting wires on the same right side via the closing of the normally-open contacts of RY201 between the upper "red" and lower "black" right terminals and the collectors respectively. A diode CR201 connects reversely in parallel with switch transistor Q201 (with respect to its emitter) and another diode CR202 connects reversely in series between the emitter of switch transistor Q202 and the left "black" terminal The gate of switch transistor Q201 connects with resistor R201 and then connects in series with the output of diode CR211, and the other end of diode CR211 connects with the right "red" conducting wire located at one side of a normally open contact of RY201, the other side of said contact being connected with the collector of Q201. The gate of switch transistor Q202 connects with a resistor R202 and this resistor is then connected in series with the output of diode CR212. The other end of diode CR212 connects to both the conducting wire right "black" and also to one contact of another pole of RY201 having normally open contacts. The other contact of this pole is connected with the collector of Q202. When the above-said wiring makes the polarity of the right "red" positive and the left "red" positive, the signal current conducts from CR211 through R201 since the left "red" is positive, the collector to Q201 is positively biased thus turning on the gate of Q201 and thus turning on Q201 and current then flows through the coil of relay RY201 to CR232, so that a signal circuitry is formed. Moreover, the current flows from the collector of Q201 to the emitter and through the coil of relay RY201 passing through CR202 to complete a completed circuit path, so that the contact point of relay RY201 is closed. When the right "red" conducting wire, (i.e. right "black") is negative, and the left "black" is positive, its signal current flows from CR212 along R202, the gate of Q202 since left "black" is positive, the collector of Q202 is positive and thus Q202 turns on, current flows through the coil of relay RY201 and then through CR231 to form a completed circuit so that the electric current flows through the collector to the emitter of Q202 and then through the coil of relay RY201 as well then as through CR201 to form a completed circuit, thus the contact points of relay RY201 are closed.

When the conducting wires on both sets have different polarities at their respective "color" terminals, the voltage at the collector of switch transistor Q201 or Q202 have different polarities as that of the gate current(s), so that the switch transistor(s) disables and the change-over relay RY201 also disables. The normally-open contact points of another set of reverse polarity change-over relay RY202 are connected crossedly respectively with the conducting wires on both sides. The terminals of coil RY202 are connected in series with respectively and between the emitters of two sets of switch transistors Q203 and Q204. The collectors of two switch transistors Q203 and Q204 are connected respectively with the two input contacting wires "red" and "black" on the same left side. The diode CR203 is connected from the emitter of Q203 to its collector and thus parallel with switch transistor Q203. Diode CR204 is connected similarly in parallel with Q204 from its emitter to its collector. A triggering resistor R203 is connected between the collector and gate of Q203 and a shunt transistor Q213 is connected with the collector of Q213 connected to the gate of Q203, and the emitter of Q213 connected to the emitter of Q203. Similarly, at the left "black" section, triggering resistor R204 is connected in parallel between the collector of Q204 and the gate of switch transistor Q204, and shunt transistor Q214 is connected similarly in parallel between the gate and emitter of Q204. In each such circuit section triggering resistor R203 or R204 causes respective switch transistor Q203 or Q204 respectively to turn ON during turning-off of the respective shunt transistor Q213 or Q214. Similarly the respective switch transistor will turn OFF during turning-on of its associated shunt resistor. Diode CR233 connects the emitter of switch transistor Q203 with the right "red" conducting end terminal. The gate of shunt transistor Q213 is connected with one terminal of resistor R213. The other terminal of resistor R213 is connected with the output of diode CR213. The other terminal of diode CR213 is connected also with the right "red" conducting end terminal. The terminals of CR233, CR211, CR231 and CR213 that are connected to the right "red" conducting end terminal are connected to one terminal of one contact of one normally-open pole of RY201. The other respective contact is connected with the collector of switch transistor Q201, the output of CR201, the output of CR203, and one terminal of one contact of one normally-open pole of RY202 and the left "red" conducting end terminal. The other terminal being connected to the right "black" conducting end terminal. The positive terminals of diodes CR231 and CR201 are connected to the emitter of Q201. The positive terminals of diodes CR203 and CR233 are connected to the two tied emitters Q203 and Q213. Another diode CR234 connects reversely in parallel between (1) the emitter of switch resistor Q204 and (2) the right "black" conducting end terminal. The gate of shunt transistor Q214 is connected with a terminal of resistor R214. The other terminal of resistor R214 connects with the output of diode CR214. The other terminal of diode CR214 is connected also with the right "black" conducting end terminal The terminals of CR234, CR232, CR214, CR212 that are connected to the right "black" conducting end terminal are connected to one terminal of one contact of one normally-open pole of RY201. The other respective contact is connected with the collector of switch transistor Q204, the collector of Q202, the output of CR204, the output of CR202 and one terminal of one contact of one normally-open pole of RY202, and the left "black conducting end terminal; the other terminal of RY202 being connected to the right "red" conducting end terminal.

When this electric circuit has different polarities on the upper left and the upper right conducting wire, for example with reverse polarities in the lower set of conducting wire end terminals (i.e. "+" on left "red", "−" on right "red") shunt transistor Q213 turns off. The collector of Q203 will be positive. At this moment, the electric current flows through Q203, change-over relay RY202 and diode CR204 to lower set conducting wire (left "black" "−"), so that the crossed connecting normally open contact point sets of RY202 are closed and the two "sides" are connected with conducting end terminals of the same polarity. If the left side upper conducting wire (left "red") is negative and its right side (right "red") is positive (reverse polarity on the lower set conducting end terminal wires), then the shunt transistor Q214 turns off. At this time, the electric current flows through the transistor Q204, relay RY202 and diode CR203 to form a completed circuit path, so that the crossed connecting contact points of both poles of normally open sets of contacts of RY202 are closed and two sides connect with the conducting end terminals having the same polarity.

Based on the economic point, FIG. 3, 3-1 and 3-2 are the examples of simple electric circuits, in which each of the two terminals of one set of normally open contact points of a single pole of the relay RY301 are connected respectively to the left "red" and right "red" terminals of the upper set of conducting wires. An end of the coil of RY301 connects with the emitter of the switch transistor Q301. The collector of switch transistor Q301 is connected to the output of the diode CR301. The other end of the diode is connected to the left upper terminal of the left upper set conducting wire (left "red") and a first side of a set of contacts of said relay. The gate of the switch transistor Q301 connects with one terminal of resistor R302.

The other end of resistor R302 connects with the output of diode CR302 and the other input side of diode CR302 connects with the second contact point of said pole of said relay and also is connected with the upper right conducting wire (right "red"). A LED 301, used for display, is connected in series with current reactance resistor R301, and the two of them are then connected in parallel with the coil of relay RY301. A positive upper right conducting wire terminal and a positive upper left conducting wire terminal are the sole operating conditions of this electric circuit. Only when it is under these conditions, the switch transistor Q301 is triggered by the electric current coming from CR302 and R302 and is conducting, so that the relay RY301 acts and closes. If the operating condition is not correspondent, the relay disables. Furthermore, in order to avoid the spark during physical wiring of two sides, as shown in FIG. 1-2, the coil of above-said relay RY301 can further connect in series with an On-time delay circuit as shown in FIG. 3-1. Its applicable examples are shown in FIG. 3-2. Its active principle is the same as that shown in FIG. 1-3.

Figures 1, 2, 3, 4:
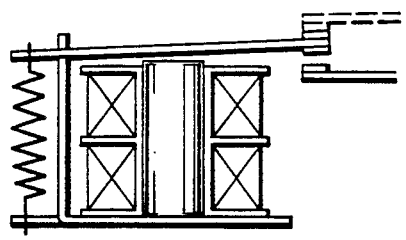

In order to enlarge the usefulness and applicability of this electric circuit polarity and overload protection, this invention can be further embodied as shown in FIG. 4. It contains mainly:

Conducting wire terminal pairs, as previously described;

Nonpolar (unipolar) power source: Two AC ends of two sets of bridge rectifying ("b.r.") circuits BR401 and BR402 are connected in parallel respectively with one b.r. between the left conducting end pair and one b.r. between the right conducting end pair. The positive poles P401, P402 of two sets of bridge rectifiers BR401 and BR402 connect with each other ("P+"). Their negative poles N401, N402 connect also to each other ("N−"). Therefore, it can provide a control power source under any connecting polarity state;

Detecting circuit "A": Its design lies in that two voltage drop resistors R401 and R402 are each connected in series respectively between two connected connectors of the same "color" code terminal. The value of R401 is more than of R402 for reducing the detecting error for forming R401, i.e. when the reverse polarities connect with each other, the voltage drop between two ends of R402 will limit the input voltage of this electric circuit which can distinguish minimum reverse polarity, for example, when a charger or battery charges another battery, the voltage which can be still charged is ⅓ of the normal voltage and can be not less than the voltage drop across R402, so that R401, R402 can be selected, when the voltage drop of reverse input state R401 must be larger than single added voltage VB. Using a set of bridge rectifying circuit BR403 used for detection connected in parallel with two ends of resistor R401, any connecting polarity state can provide a detecting voltage. Its detecting states include:

A. When the polarities of parallel connection is correct, the voltage drop on two sides of resistors R401 and R402 is not greater than connecting D.C. voltage VB.

B. When the series connection has wrong polarities, the voltage between R401 and R402 is greater than connecting D.C. voltage VB. The output of said detecting bridge rectifier BR403 connects in series with a Zener diode ZD401 used for polarity detecting relay RY403 form of signal switch. At this time, the Zener voltage VZ should be selected so that the voltage drop of R402/R401 plus active voltage of RY403 plus VZ is greater than connecting D.C. voltage VB. If it is composed of another signal switch plus VZ is greater than connecting D.C. voltage. Other signal switch types include photo coupler PC401 as shown in FIG. 4-1 or other solid transistor or gated switch. The bridge rectifier used for detection BR403 can be composed of reverse series connection of diode CR451 and Zener diode ZD451 as well as parallel connection of diode CR452 and Zener diode ZD452. These two sets then connect each other for replacing the bridge rectifier and Zener diode connected in series, as shown in FIG. 4-2.

Change-over relay: It is composed of two sets of relays RY401 and RY402, in which RY401 is positive directional relay, and one of its relative contact point set is connected in parallel with two ends of detecting resistor R401 and another one is connected in series with the connector of another conducting wire. RY401 is turned ON, when the polarity relationship between connectors is correct. RY402 is reverse relay and its two sets of normally-open contact point set are connected crossedly in series between two connectors with different polarities, i.e. between left "black" connector and right "red" connector, as well as between left "red" connector and right "black" connector.

The relationship between detecting circuit and the coil of above-said change-over relay set is that each one end of the coils of change-over relays RY401, RY402 are connected in parallel, (1) with negative pole N- of the non-polarity power source connected to one coil end of RY401 and the other end connected to a normally-closed contact point of RY403 and then connected to P+; and (2) N- connected to one end of the coil of RY402 and the other end connected to normally-open contact point of polarity detecting relay RY403 and also connected to an end of normally open contact point of RY202 and then to P+. Also see FIGS. 4-1, 4-2. In addition, RY402 is connected in series with the cathode and anode of SCR401 and then in parallel with the non-polarity power source. SCR401 is gate-controlled by photo coupler PC401. The coil of RY401 connects in series with normally-closed contact point of RY402 and then the combination in parallel with the non-polarity power source as shown in FIG. 4-3.

SCR401 can be controlled alternatively by normally-open contact point of detecting relay RY403, i.e. its gate is controlled by normally open contact point of the detecting relay RY403. The output of SCR401 connects in series with the coil of RY402 then the combination connects in parallel with the non-polarity power source. A coil end of RY401 connects with negative pole of non-polarity power source and its other end connects to a normally closed contact point of RY403 with the common contact point of RY403 connecting to the positive pole of non-polarity power source as shown in FIG. 4-4. A LED used for display is connected in parallel with non-polarity parallel power source.

Based on the above-said structure of the electric circuit, we can get the function of automatic polarity change-over. Its actions are as follows:

(a) When D.C. power sources on the two sides (left and right set of terminals) have the same polarities, and the total voltage of R401 and R402 is not greater than the outer connecting D.C. voltage VB, the predetermined Zener voltage of ZD401 is not reached so that the detecting relay RY403 is disabled, n.c. RY403 contacts are closed and thus positive directional relay RY401 is closed;

(b) When the outer connecting D.C. power source on two sides have reverse polarities, the voltage drop of R401 makes RY403 to act, the normally-open contact of RY403 closes so that reverse exchange relay RY402 closes and makes a change-over of polarities.

Figures 1, 2, 3, 4, 5:
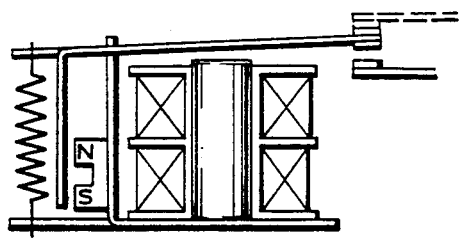
Figure 2:
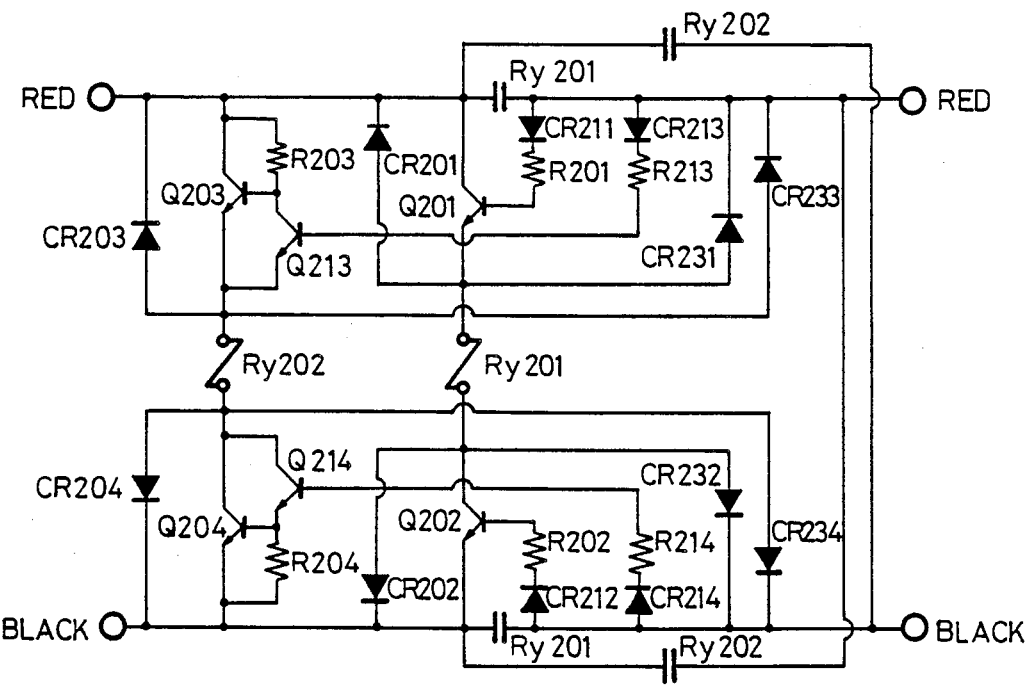
Figure 3:
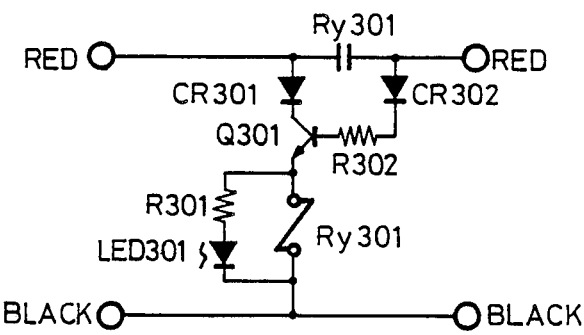
Figures 1, 3:
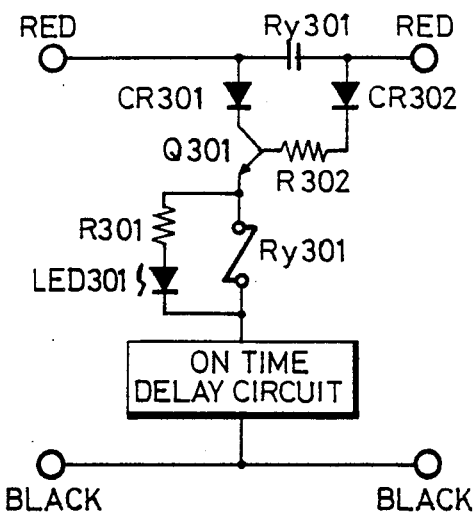
Figures 2, 3:
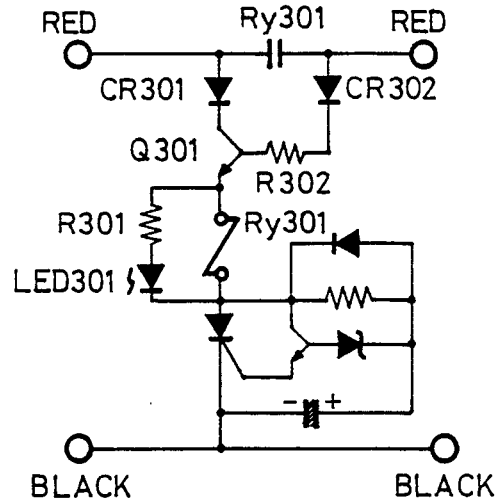
Figure 4:
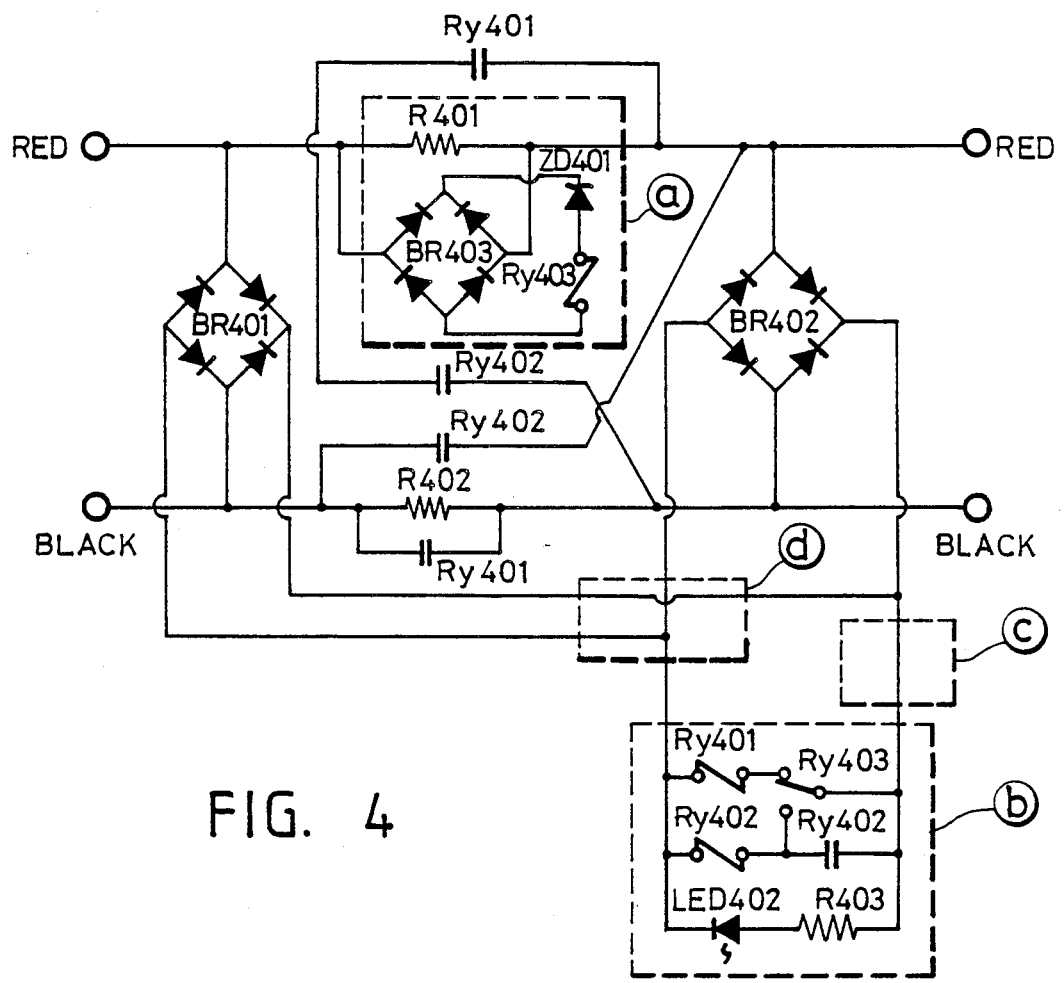
Figures 1, 4:
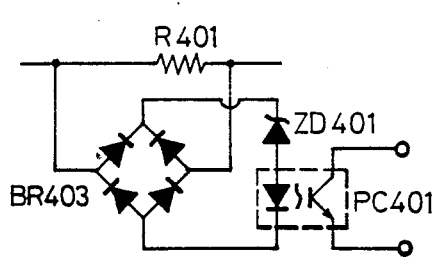
Figures 2, 4:
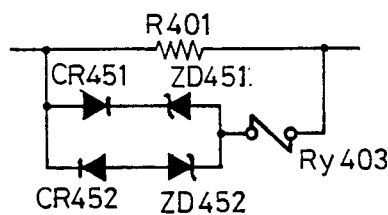
Figures 3, 4:
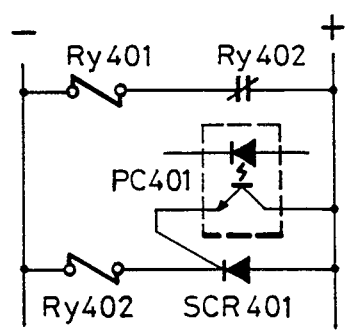
Figure 4:
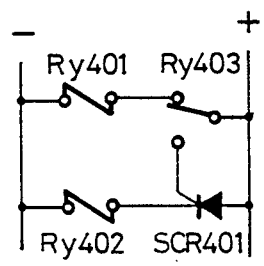
Figures 4, 5:
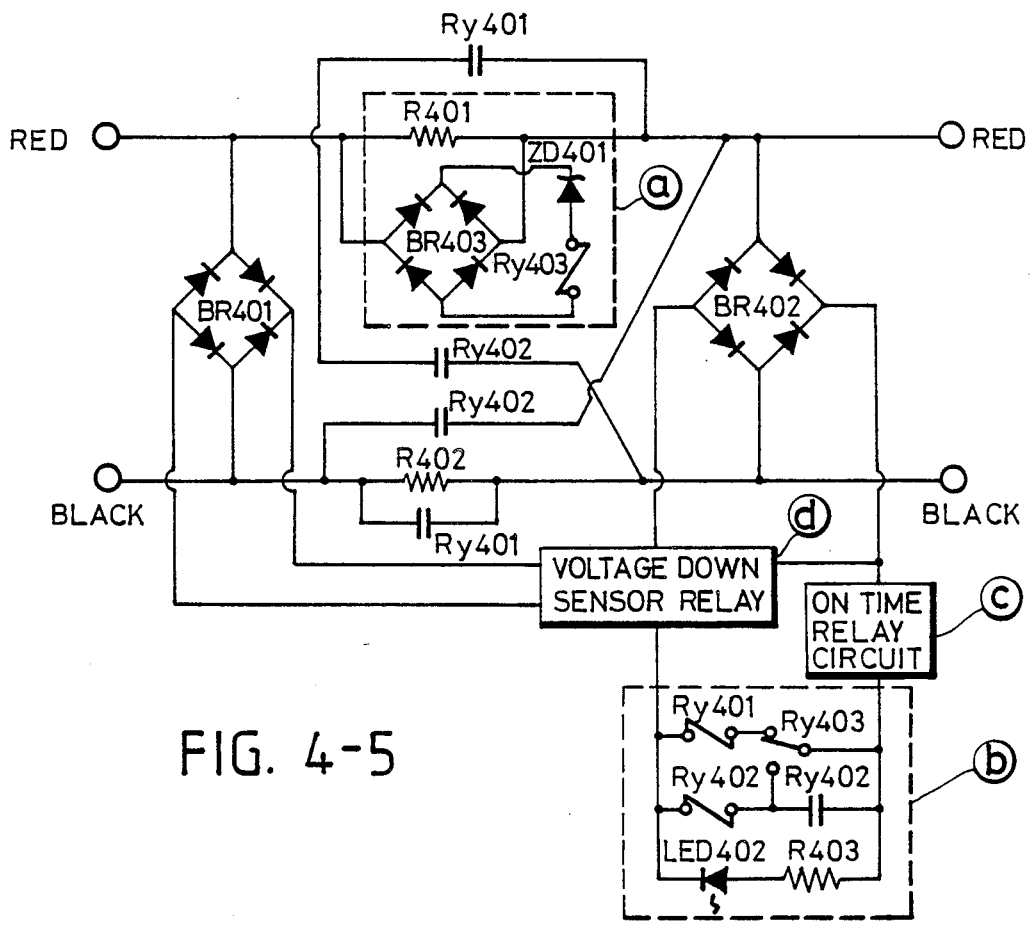
Figures 4, 5, 6:
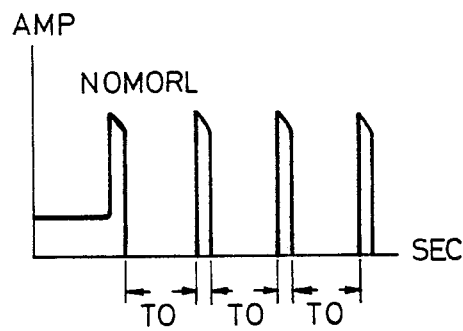

In FIG. 4, block A is the "detecting electric circuit", block B is the "processing electric circuit", block C is the "On-time delay circuit" used for eliminating the spark during the making of wiring corrections, and block D is voltage drop detecting circuit. As shown in FIG. 4-5, the parallel D.C. power source is used for emergency or charge. It will generate the voltage drop during the overload. This electric circuit provides an interval switch protecting function during the overload, i.e. when overload and associated large voltage drop occur, the change-over relay B cuts out, and the time of the On-time delay circuit is delayed, so that the overload protecting characteristic timing diagram as shown in FIG. 4-6 is formed; FIG. 4-7 is a view showing an applicable embodiment of this electric circuit with voltage down sensor relay, D, in which a voltage drop detecting relay RY404 connects in parallel with the non-polarity power source. Its coil is connected in series with a Zener diode ZD402 for making said relay cut in, when the voltage is dropped to the presetted value and thus the overload has occurred. Its normally-closed contact point is connected in series between the non-polarity power source and processing electric circuit for cutting off the load, when the voltage is dropped to the preset value. Its On-time delay circuit C is connected in series between the positive pole of the non-polarity power source and polarity processing circuit Its active principle is similar to that shown in FIG. 1-3. The above-said On-time delay circuit C and voltage drop detecting circuit D can be also as that shown in FIG. 4-8, in which RY404 is omitted and ZD 402 connects directly in series between the non-polarity power source and the On-time delay circuit C and processing electric circuit, or, as shown in FIG. 4-9, the On-time delay circuit connects in series with the voltage detecting circuit.

Furthermore, the detecting electric circuit shown in FIG. 4 can be further comprised of a microprocessor. Its signal processing is shown in FIG. 5. Its further features of the structure are as follows:

Change-over relays RY501 and RY502 each have two sets of normally-open contact points respectively, in which the contact points of RY502 are connected respectively in series between two ends of the conducting wire of the same "color coding:, i.e. between left "red" and right "red" and left "black" and right "black" and RY501 is connected crossedly between oppositely "color coded" conductor ends/terminals, i.e. between left "red" and right "black" and between left "black" and right "red";

A CPU has as inputs a left polarity input end P1, a right polarity input end P2, a detecting end P3 for detecting its own input voltage charge value, and has as outputs a "same polarity" relay drive output P4 and a "cross polarity" relay drive output P5;

Non-polarity power source: it comprises two sets of bridge rectifying circuit composed of diodes CR501, CR502, CR503, CR504 and CR505, CR506, CR507, CR508 Its A.C. inputs are connected respectively in parallel with the two inputs, one from each side, and its D.C. inputs also connect each other in parallel at the same two sets of pairs of conductor ends/terminals, a left "red" and "black" set, and a right "red" and "black" set. Therefore, as long as one set of them has power source, it can supply power to polarity exchange relay in spite of the battery polarity relay connected with two inputs;

Polarity detecting equipment; In which, voltage drop resistor R501, R502, diodes CR509, CR510 and two sets of photo couplers PC501, PC502 are setwise connected (R501, CR509, PC501) (R502, CR510, PC502) in parallel with the conductor end input pairs on both sides as shown in FIG. 5. When the connected battery has same polarity as the direction obstructive diode, the output of photo coupler conducts; when the connected battery has reverse polarity of obstructive diode, the photo coupler cuts out. This detecting equipment needs mainly an output insulated from the detecting source for controlling the insulation, so that it can be replaced by the relay.

The microprocessor's inner programs include the following flow processes and functions:

(1) When inputs P1, P2 have the same polarities, P4 outputs current for driving relay RY502.

(2) When inputs P2, P2 have different polarities, P5 outputs current for driving relay RY501.

(3) It produces a time delay for initiating the output for the above-said P4, P5.

(4) The voltage change of power source due to overload can be set in advance and it can't drive either of the change-over relays RY501, RY502 during the time that the voltage of the power source exceeds this value. The said processor is connected with the stable power source coming from the unpolar source. It gets the change data of the power source from unpolar power source V + before stable voltage. Each of the change-over relays RY501, RY502 can be controlled indirectly by the respective transistor that is connected in series with the respective relay coil or micro-relay. From above-said control circuit, we can get:

(a) Automatic polarity exchange function controlled by the programs 1, 2.

(b) Program 3 makes connector to conduct only at small electric current during the power supply beginning, so that no spark occurs.

(c) Program 4 cuts out the electric circuit by having both RY501 and RY502 open during the overload.

This charging wire can be further designed as shown in FIG. 5-1, in which automatic polarity exchange circuit can be controlled by a single change-over relay RY503 and the microprocessor, RY503 having two sets of normally open contact points and two sets of normally closed contact points. Its main circuit includes:

Change-over relay RY503 has two sets of normally-open contact points and two sets of normally-closed contact points, in which the left side terminals of the contacts each have a common point which connects to one of the two inputs of the left side conducting ends/- terminals charging wire set. The other terminal of the left "red" normally-closed contacts is connected to the right "black" conducting end terminal Similarly, the other terminal of the left "black" normally-closed contacts is connected to the right "red" conducting end terminal. The other terminal of the left "red" normally-open contact is connected to the right "red" conducting end terminal. Similarly, the other terminal of the left "black" normally-open contact is connected to the right "black" conducting end terminal. The normally-closed contact points are connected crossedly to form a crossed parallel connection and the normally-open contact points are connected to the same color coded conducting end terminals on two inputs depending upon whether exchange relay RY503 acts or not. Its coil is connected in series with a control transistor Q501 and then with the nonpolar power source This electric circuit has the same action as that shown in FIG. 5. Its polarity exchange is amended by the action or no action of the normally-open and normally-closed contact points of a single relay.

Figures 4, 5, 6, 7:
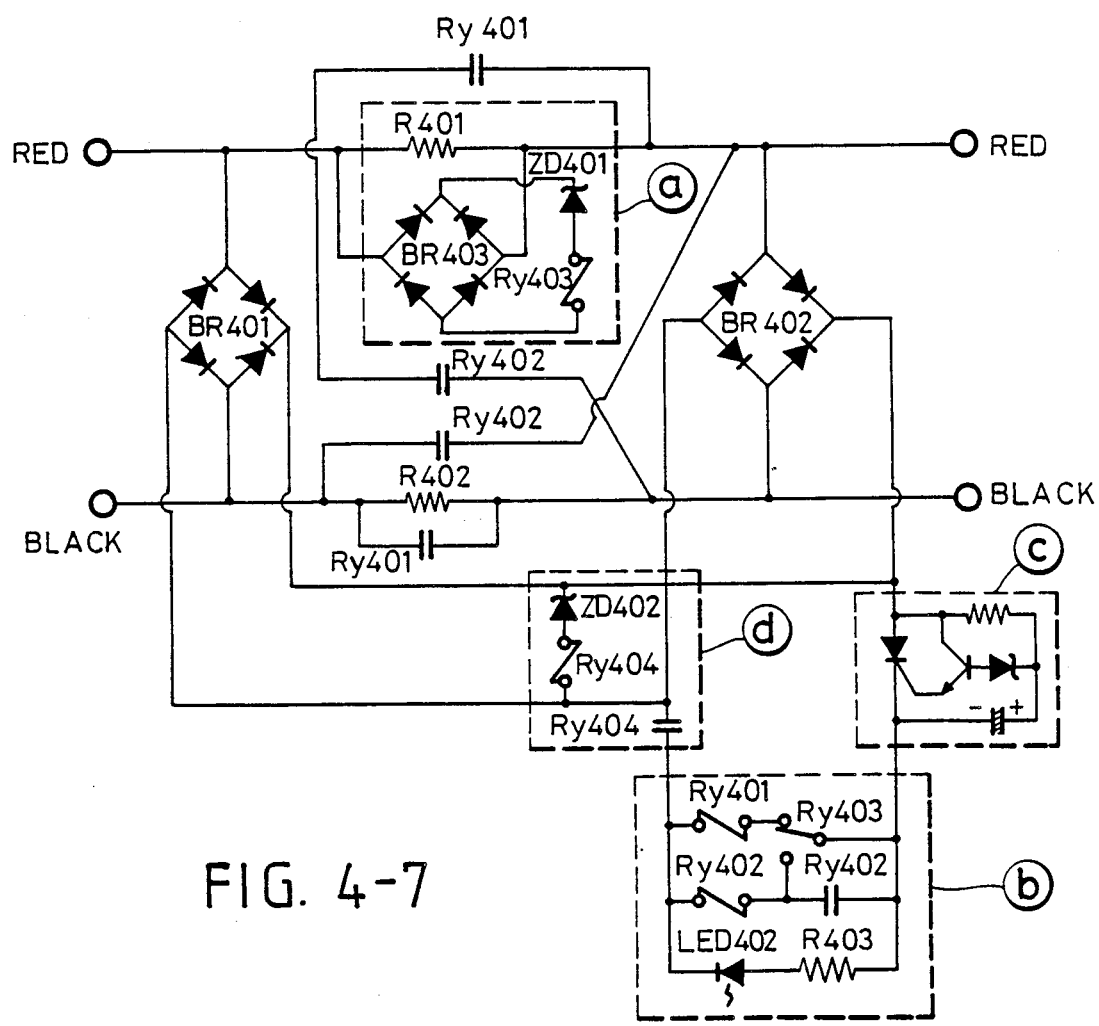
Figures 4, 5, 6, 7, 8:
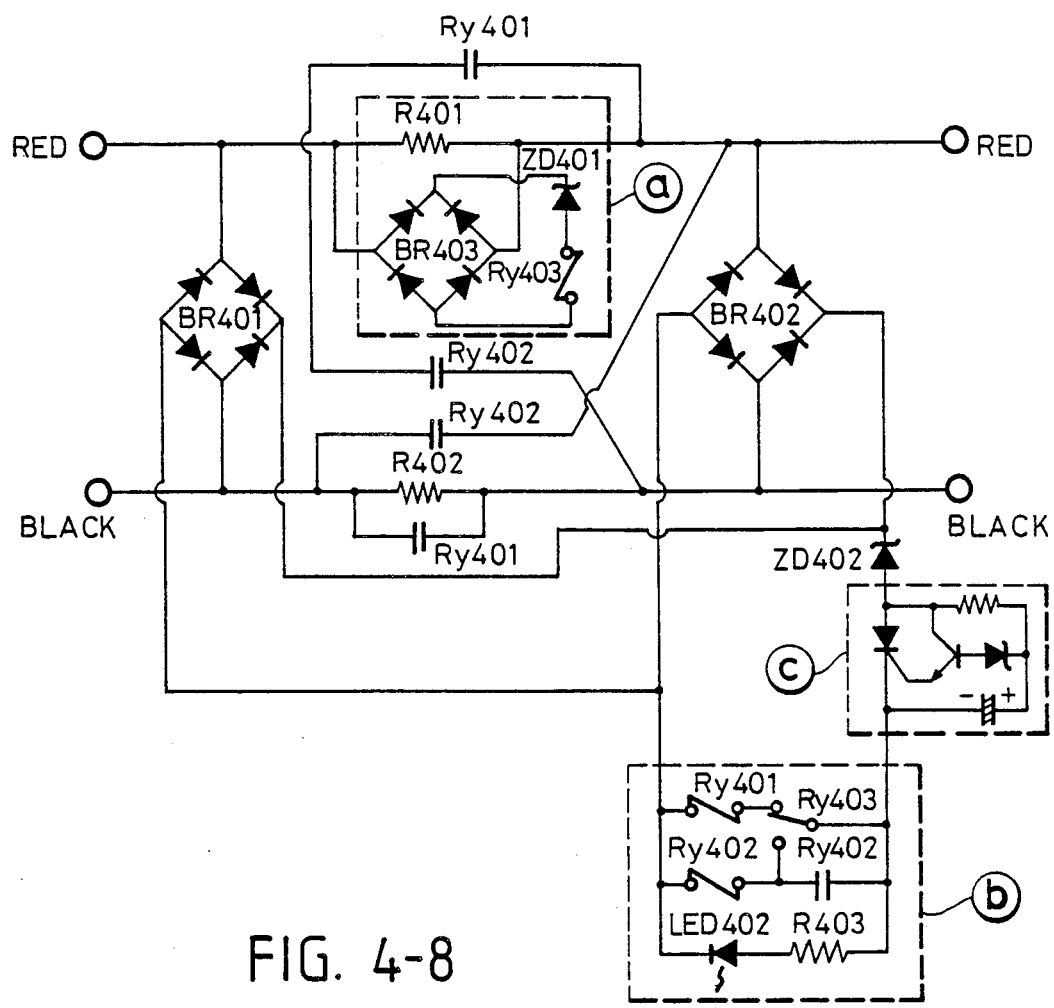
Figures 4, 5, 6, 7, 8, 9:
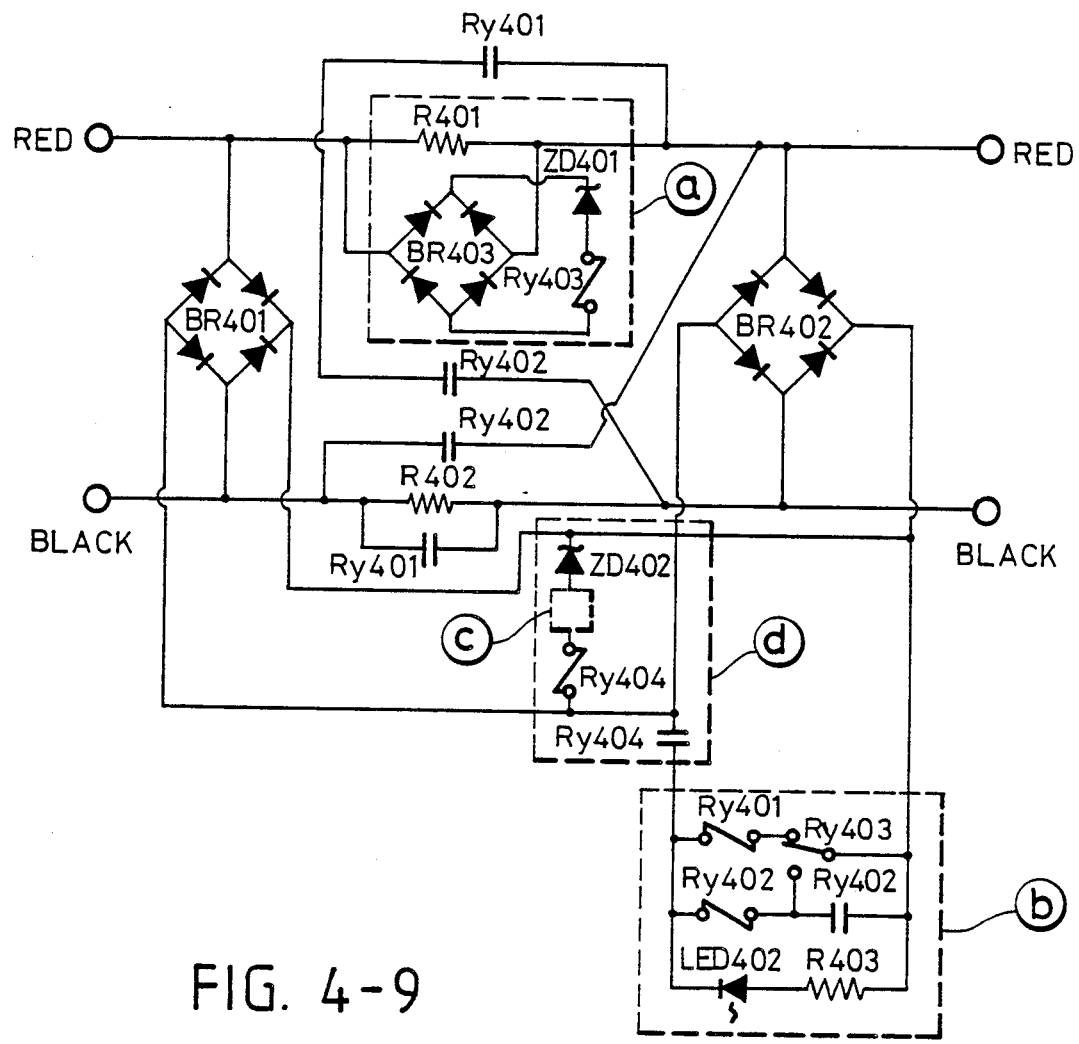
Figure 5:
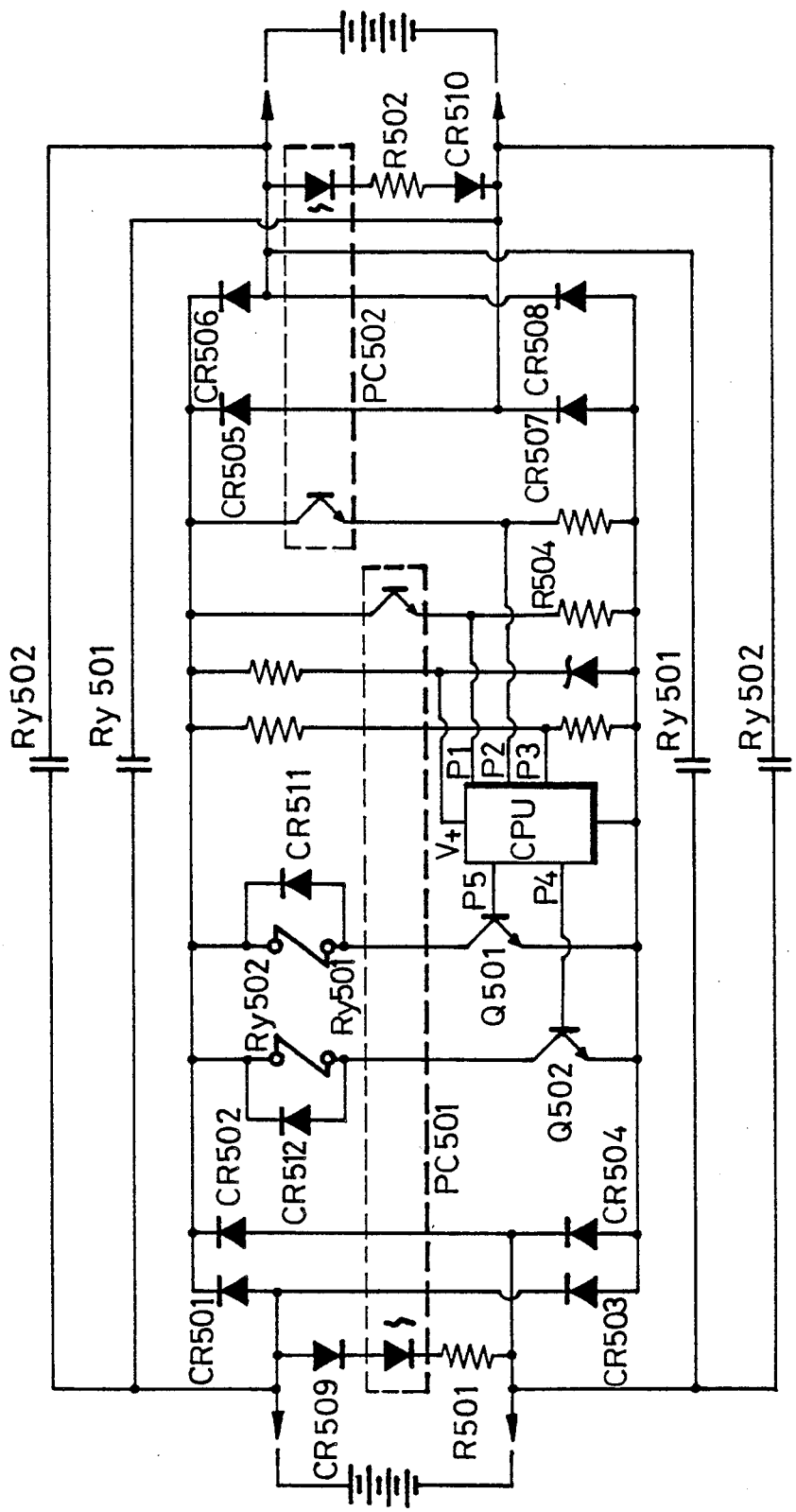
Figures 1, 5:
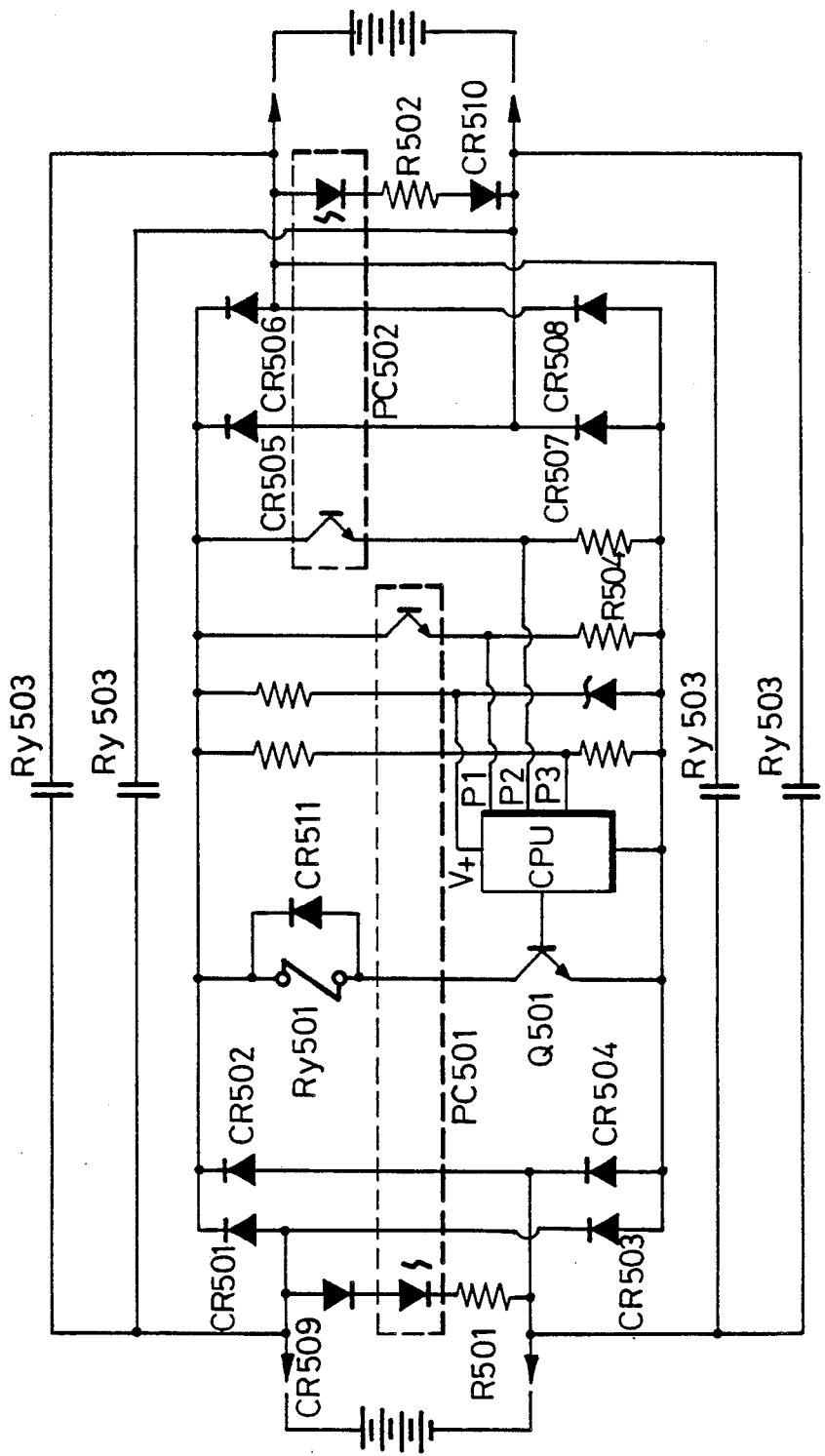
Figures 1, 2, 6:
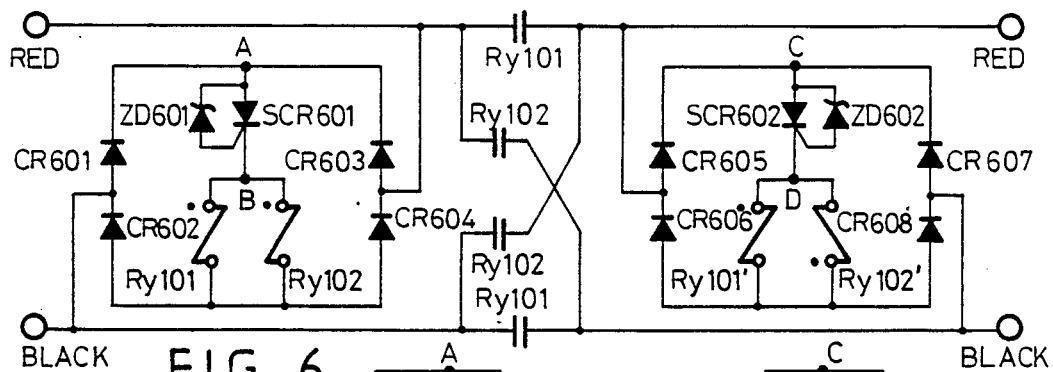
Figure 7:
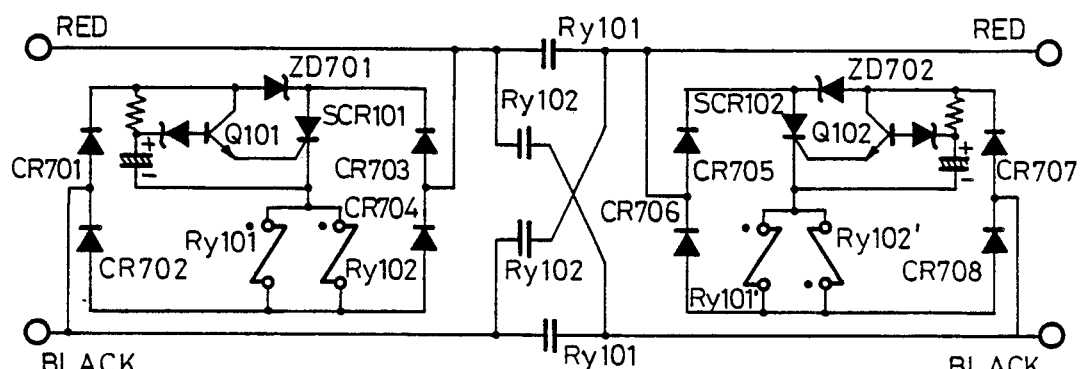
Figures 1, 2, 8:
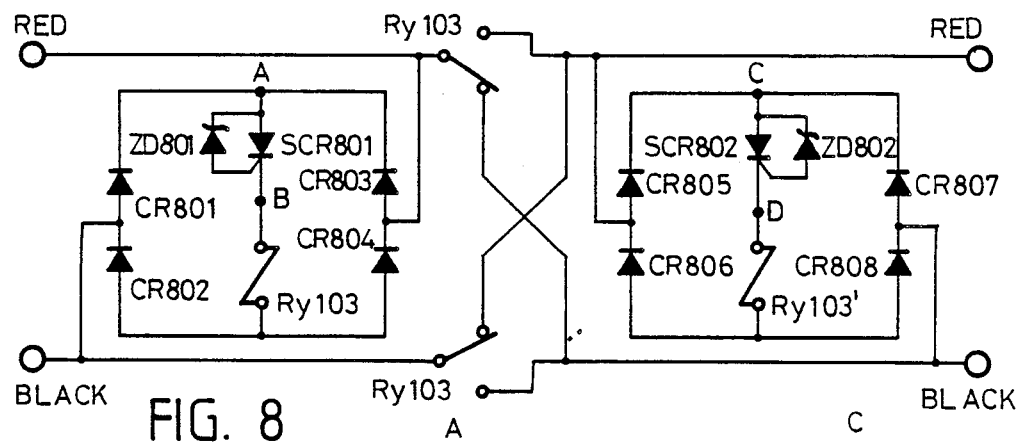

In various examples shown in FIG. 1, 1-1 and 1-2, its connecting D.C. voltage is just at active critical value of relay, the closing speed of the relay is slow. In order to increase its active function, FIG. 6, 7 and 8 shows that it is driven by a voltage-limiting active circuit;. The circuit shown in FIG. 6 adds additionally a voltage-limiting active circuit to the embodiment of FIG. 1, in which the connectors on two sides of it are composed of CR601, CR602, CR603 and CR604. The positive output of a left side bridge rectifier BR601 is connected in series with the anode of SCR601 (or the collector of switch resistor Q601). A Zener diode ZD601 is connected in series between the anode and gate of SCR601 (gate to negative terminal of ZD601). Relays RY101 and RY102 are connected in parallel to each other and the combination of the two are connected between the negative pole of CR602 and the "black" terminal of the left conducting terminals. When Zener diode voltage VZ (of ZD601) plus the bridge diode voltage drop and triggering voltage VG of SCR601 is less than the outer connecting voltage at and between the left side conducting end terminals SCR601 is triggered and drives the coils of relays RY101 and RY102. Similarly, the positive output of another bridge rectifier set BR602 composed of CR605, CR606, CR607 and CR608 is connected in series with SCR602 (or switch transistor Q602) and a Zener diode ZD602); said ZD602 connected from the gate to the anode of SCR602. The relays RY101' and RY102' are connected in parallel with reverse magnetizing polarity with respect to each other and are connected between the negative pole of CR606 and the "black" terminal of the above-noted right side conducting terminals. When Zener diode voltage VZ plus the bridge diode voltage drop plus triggering voltage VG of SCR602 is less than the outer connecting voltage on the right side conducting end terminals, SCR 602 is triggered and drives the coils of relays RY101', RY102'. The wiring of the contact points of the two sets of relays is same as that shown in FIG. 1 (requiring two coils of a relay to be driven in pre-specified magnetic polarity in order to cause the normally open blade to close). This electric circuit is used for outer connecting voltage only in order to improve its active feature If above-said SCR is replaced by a switch transistor, then its Zener diode should be connected between the collector (+side of Zener) and the gate of the switch transistor ("−" side of Zener).

FIG. 7 is an applicable example of said voltage-limiting active electric circuit combined with an On-time delay circuit, in which a left bridge rectifier is composed of CR701, CR702, CR703 and CR704. Its two A.C. inputs are connected between input connectors. Its positive output of CR703 connects to the anode ("+") of SCR101 of an On-time delay circuit. The negative terminal of SCR101 is connected to the positive terminals of CR702 and CR704. The gate of SCR101 is connected to the emitter of Q101 with its collector connected to the "−" terminal of ZD701 with the positive terminal of ZD701 connected to the negative terminals of CR703 and CR701 and the positive terminal of SCR101. The gate of Q101 is connected to the positive side of a timing capacitor CO. The other side of the capacitor is connected to the negative terminal of SCR101. A delay resistor RO is connected between the gate of Q101 and the negative terminal of ZD701. A bleeding diode is connected in parallel to said resistor. Current reaches the positive terminal of the bridge. When the Zener voltage is exceeded, current goes to the gate of Q101 at a rate determined by the delay resistor and timing capacitor's timing constant. Upon reaching the critical valve the gate of Q101 turns on Q101, causing current to flow from the emitter of Q101 to the gate of SCR101 thus turning the SCR on in a delayed manner. The coils of relays RY101, RY102 are connected in parallel configuration between the negative terminal of CR702 and the left "black" terminal Similarly, another bridge rectifier is comprised of CR705, CR706, CR707 and CR708 on the other side. Its A.C. input is connected between input connections. Its positive output connects to positive pole of SCR102 of an On-time delay circuit. A duplicate of the circuit discussed is positioned on the right side and coils of relay RY101 and RY102 in reverse configuration and in parallel between said circuit and the right "black" terminal. When the right outer connecting voltage is greater than Zener voltage VZ of Zener diode ZD702, the power supply delays and electric circuit action triggers then the coils RY101' and RY102' for polarity identification and change-over. As to FIG. 8 the positive output of bridge rectifiers composed of CR801, CR802, CR803 and CR804 located on two sides of connectors shown in FIG. 8 are connected in series with SCR801 (or switch transistor Q801) and a Zener diode ZD801 is connected between positive pole ("+" of ZD801) and the gate of SCR801 ("−" of ZD801). The relay RY103 is connected between the negative terminal of CR802 and "black" terminal of the left side set of conducting terminals. When the voltage VZ of Zener diode plus bridge diode voltage drop plus triggering voltage VG of SCR801 is less than outer connecting voltage, SCR801 is triggered and drives the coils of relay RY103. Similarly the positive output of another bridge rectifier on the right side composed of CR805, CR806, CR807 and CR808 on another side is connected with the "+" anode of fluid SCR802 (or switch transistor Q802). A Zener diode ZD802 is connected between positive pole and gate of SCR802 as shown. The relay RY103' is connected between the negative terminal of CR806 and the right "black" conducting terminal. When voltage VZ of the Zener diode plus bridge diode voltage drop plus triggering voltage VG of SCR802 is less than the outer connecting voltage, SCR802 is triggered and drives the coils of relay RY103'. The contact points of these two sets of relays are similar to which shown in FIG. 1-2. As noted there, the relay activates only when the two sets of drive coils have the same polarity magnetization and it has active relationship as that of outer connecting polarity on two sides. This electric circuit is used for outer connecting voltage in order to improve its active feature. If said SCR is replaced by a switch transistor, then its Zener diode is connected between the collector and gate of the switch transistor.

Based on above description, this invention provides an automatic polarity comparison and correction function for parallel wiring of paired D.C. power equipment having unknown polarity conditions, so that an accident due to negligence caused in the dark or by human negligence can be prevented. It can use many compatible design methods to encompass its applicable range, so that it is an effective and useful improvement.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A system for comparing the polarity of two sets of pairs of terminals and for electrically connecting the terminals of matching polarity comprising:

a left upper terminal;

a left lower terminal;

a right upper terminal;

a right lower terminal;

a first double coil relay, said first relay comprising a first coil, a second coil, a first pair of normally-open contacts, a second pair of normally-open contacts, each of said first and second coils having a first side and a second side, said relay activating when both said first and second coils are magnetized in the same direction, said first side of said first coil connected to said left upper terminal and said second side of said first coil connected to said left lower terminal, said first side of said second coil connected to said upper right terminal, said second side of said second coil connected to said right lower terminal, each of said first and second coils having the same specific polarity of magnetization on the same side of said coils, said same specific polarity of magnetization of each said first and second coil associated with said first side thereof;

one contact of said first pair of contacts connected to said left upper terminal, the other contact of said first pair connected to said right upper terminal;

one contact of said second pair of contacts connected to said left lower terminal, the other contact of said second pair of contacts connected to said right lower terminal;

and wherein said first pair of contacts and said second pair of contacts become closed during the time when; (1) the polarity applied on said upper left terminal is the same as the polarity applied on the upper right terminal; and (2) the polarity applied on said left lower terminal is the same as the polarity applied on the right lower terminal;

a second double-coil relay, said second relay comprising a third coil, a fourth coil, a third normally-open pair of contacts, a fourth normally-open pair of contacts, each of said third and fourth coils having a first side and a second side;

said second relay activating when both said third and fourth coils are magnetized oppositely;

said first side of said third coil connected to said left upper terminal and said second side of said third coil connected to said left lower terminal;

said first side of fourth coil connected to said right upper terminal and said second side of said fourth coil connected to said lower right terminal, said third and fourth coils having the opposite specific polarity of magnetization of the same side of said third and fourth coils;

one contact of said third pair of contacts connected to said left upper terminal and the other contact of said third pair connected to said right lower terminal;

one contact of said fourth pair of contacts connected to said left lower terminal and the other contact of said fourth pair connected to said right upper terminal;

wherein said third and fourth pairs of contacts become closed during the time when: (1) the polarity applied on said left upper terminal is the opposite to the polarity of the right upper terminal; and (2) the polarity applied on said left lower terminal is the opposite to the polarity applied on the right lower terminal; and further comprising a first On-time delay circuit and a second On-time delay circuit, said first On-time delay circuit being interposed and connected between said first connector and said lower left terminal, said second On-time delay circuit being interposed and connected between said second connector and said lower right terminal.

* * * * *